(12) United States Patent
Sickler, Jr.

(10) Patent No.: US 8,427,163 B2
(45) Date of Patent: Apr. 23, 2013

(54) SPOT INDICATING METAL DETECTOR APPARATUS

(76) Inventor: Robert L. Sickler, Jr., Longwood, FL (US)

( * ) Notice: Subject to any disclaimer, the term of this patent is extended or adjusted under 35 U.S.C. 154(b) by 322 days.

(21) Appl. No.: 12/798,340

(22) Filed: Apr. 2, 2010

(65) Prior Publication Data

US 2011/0241687 A1 Oct. 6, 2011

(51) Int. Cl.
*G01V 3/15* (2006.01)
*G01V 3/165* (2006.01)
*G01V 3/175* (2006.01)
*G01V 3/12* (2006.01)
*G01R 33/02* (2006.01)
*G61K 9/10* (2006.01)

(52) U.S. Cl.
USPC ........... 324/329; 324/326; 324/260; 324/262; 324/337

(58) Field of Classification Search .................. 376/159, 376/154; 324/326, 327, 328, 329, 337, 260, 324/262, 345, 245; 250/392, 359; 434/1; 102/45; 340/551; 280/40, 47, 89; 901/15–18, 901/20, 44–46

See application file for complete search history.

(56) References Cited

U.S. PATENT DOCUMENTS

| 4,797,618 | A |   | 1/1989 | De Vries |         |
|-----------|---|---|--------|----------|---------|
| 5,307,272 | A |   | 4/1994 | Butler et al. |    |
| 5,350,033 | A | * | 9/1994 | Kraft    | 180/167 |
| 5,719,500 | A | * | 2/1998 | Eschner et al. | 324/329 |
| 5,869,967 | A | * | 2/1999 | Straus   | 324/326 |
| 6,333,631 | B1| * |12/2001 | Das et al.| 324/326 |
| 6,388,629 | B1| * | 5/2002 | Albats et al. | 343/757 |
|2003/0034778| A1| * | 2/2003 | Nelson   | 324/329 |

* cited by examiner

*Primary Examiner* — Patrick Assouad
*Assistant Examiner* — Christopher McAndrew
(74) *Attorney, Agent, or Firm* — William M. Hobby, III

(57) ABSTRACT

A spot indicating metal detector apparatus rides on a motorized platform having a rotary framework having a plurality of metal detectors mounted thereon with a plurality of metal detector coils positioned adjacent the ground below. The metal detector apparatus has a plurality of spray heads each associated with one metal detector detector coil for spraying a fluid onto the earth at the position the metal detector detects the presence of a metallic object.

6 Claims, 4 Drawing Sheets

SPOT INDICATING METAL DETECTOR APPARATUS

BACKGROUND OF THE INVENTION

The present invention relates to a metal detection system and especially to a spot indicating metal detector having rotating metal detectors mounted on a remotely controlled platform.

A metal detector is a device which responds to the presence of metal. It may consist of an oscillator producing an alternating current that passes through a detector coil producing an alternating magnetic field. When metal is brought close to the coil, a current is induced in the metal and produces an alternating magnetic field. A second coil is used to measure the changes in the magnetic field due to the metallic object detected. A metal detector can be made to discriminate between metals by the use of an induction balancing system in which two coils are electrically balanced. Different metals have different phase responses when exposed to alternating current so that the metal detector can selectively recognize different metals.

Metal detectors typically use a beat frequency oscillator or an induction balancing system but also sometimes use a pulse induction detection. The pulse induction detector fires a high voltage pulse into the ground and measures the decay of the pulse for the voltage to drop to zero.

Prior art metal detectors used by amateurs and treasure hunters are commonly hand-held metal detectors mounted on an elongated arm having a search coil head on one end with an electronic power supply and operating controls at the handle end. Manually supported metal detectors have become common for use by treasure hunters and hobbyists in the search for coins and metal objects buried in the ground. The metal detector is held by the user in one hand without any supporting device to carry part of the weight. A detector arm is then extended at an angle to position the detector coil a short distance above the ground and moved back and forth in a pattern over the surface of the earth. The detector coil picks up a signal when a metal object is located beneath the coil head.

The De Vries U.S. Pat. No. 4,797,618 provides a wheeled carrier for a metal detector to facilitate the use of the metal detector being moved across the earth. There has also been a number of suggestions for placing a metal detector on a remote controlled platform, such as can be seen in the Butler et al. U.S. Pat. No. 5,307,272 for a minefield reconnaissance and detector system. Mine detection systems have also been devised having remotely controlled sensors, such as seen in the Das et al. U.S. Pat. No. 6,333,631 for a cantilevered manipulator for autonomous non-contact scanning of natural surfaces for the deployment of landmine detectors. The Straus U.S. Pat. No. 5,869,967 is for a device for the detection of objects, especially explosive objects, lying in the earth.

It has been recently suggested to have a remote controlled metal detector using a remotely controlled buggy having a metal detector mounted thereon which can send an audible beep when metal is detected by a metal detector on the remotely controlled buggy.

In the present invention, a spot indicating metal detector rides on a motorized platform with a rotating frame having a plurality of metal detectors mounted thereon. The metal detector scans the earth below and actuates a spray system upon the detection of metal and sprays a marker fluid onto the earth to mark the actual spot where metal is detected. The motorized platform may be remotely controlled.

SUMMARY OF THE INVENTION

A spot indicating metal detector apparatus has a motorized platform having a plurality of wheels and is remotely controlled for steering the platform. The motorized platform has a motorized shaft vertically extending therefrom with a rotary frame attached thereto for rotation therewith. A plurality of metal detectors is mounted to the rotary frame for rotation with the shaft. Each of the metal detectors has a detector coil mounted to the frame adjacent to the earth. A plurality of spray heads are mounted to the frame, each one adjacent one of the plurality of detector coils for rotation with the frame for spraying a marker fluid therefrom onto the earth and actuated by one of the metal detectors detecting the presence of a metallic object. The plurality of metal detectors on the removable platform identifies the position of a detected metal object and marks the position with a spray marker. The rotary frame may have an upright frame portion and a ring frame portion having a plurality of detector coils attached thereto and a plurality of angled frame members attaching the upright frame portion to the ring frame portion. The frame also has a fluid reservoir attached thereto for supplying a fluid to each of the spray heads. The fluid reservoir may contain any marking material, such as a liquid dye. The motorized platform has a plurality of four wheels.

BRIEF DESCRIPTION OF THE DRAWINGS

Other objects, features, and advantages of the present invention will be apparent from the written description and the drawings in which.

DETAILED DESCRIPTION OF THE PREFERRED EMBODIMENT

Figure 1:
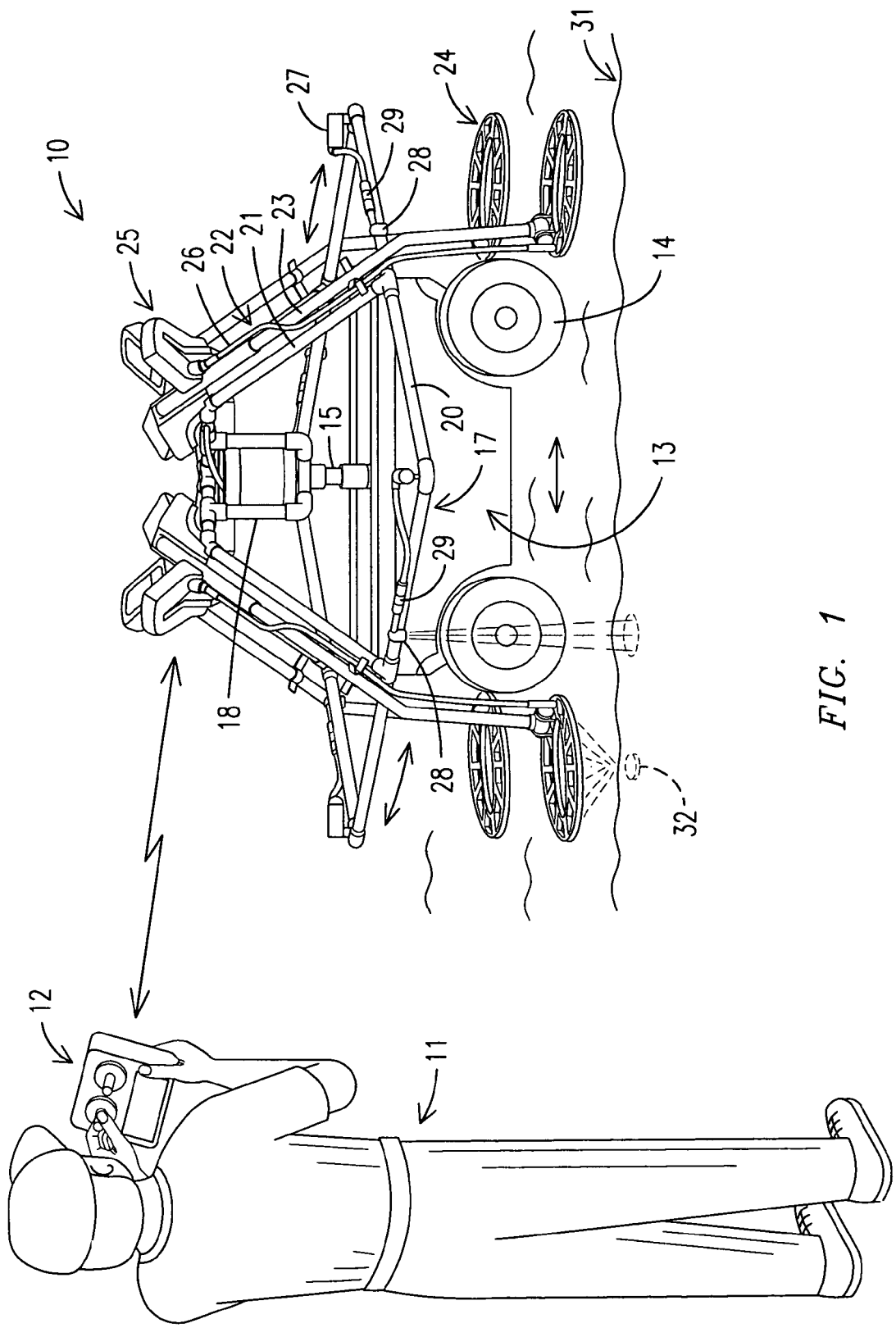
FIG. 1 is a perspective view of the present spot indicating metal detector being remotely controlled by an operator.
Figure 2:
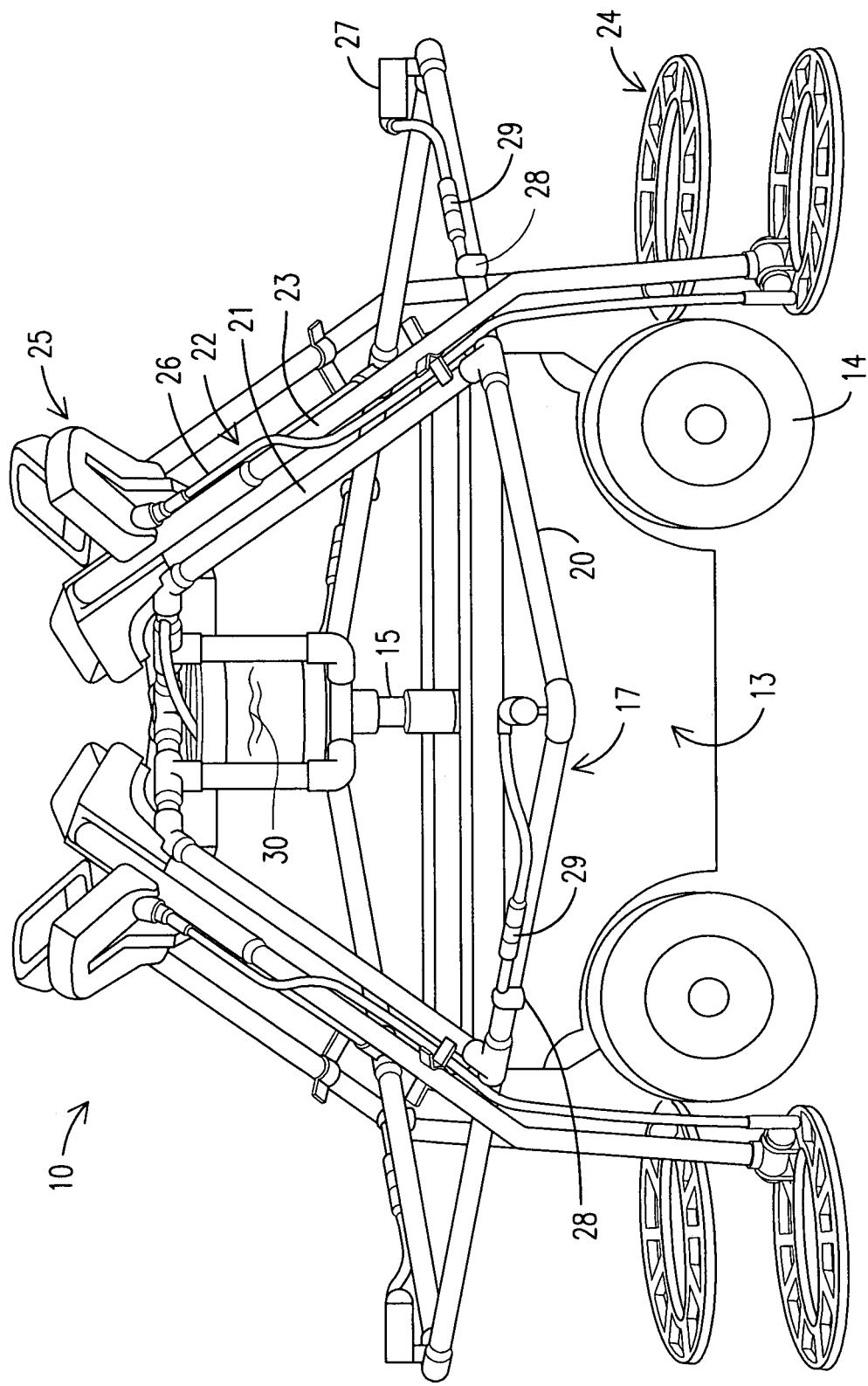
FIG. 2 is a perspective view of the spot indicating metal detector of FIG. 1.
Figure 3:
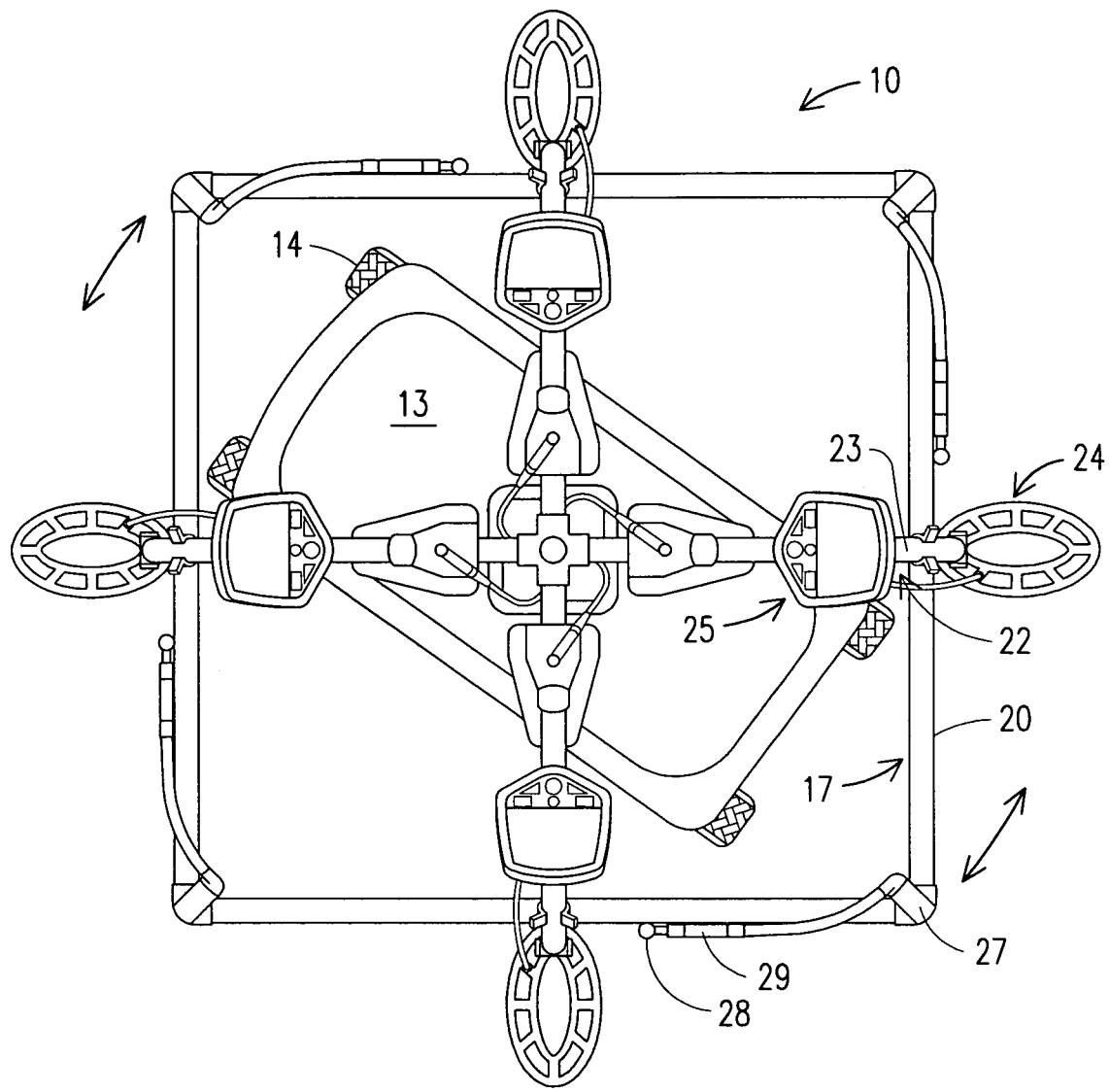
FIG. 3 is a top plan view of the spot indicating metal detector of FIGS. 1 and 2.

Referring to FIGS. 1 through 3 of the drawings, a spot indicating metal detector 10 is being remotely controlled by an operator 11 in FIG. 1 using a remote control 12. The metal detector has a motorized platform 13 having four motorized wheels 14 which platform 13 is remotely controlled by the control 12 of FIG. 1. The remote control platform 13 has a motorized shaft 15 extending vertically therefrom and supporting a frame 17 which includes an upright frame portion 18 and a ring frame portion 20 with an angled frame portion 21 connecting the upright frame 18 with the ring frame 20. The rotating motorized shaft 15 is rotated by an electric motor which rotates the entire frame 17. The rotating frame 17 has a plurality of metal detectors 22 mounted thereto and in FIG. 1 through 3 has the metal detectors each having an arm 23 having a detector head or coil 24 mounted on one end and the electronics and electronic housing 25 mounted on the other end thereof. One control head may also be used controlling multiple coils. A cable 26 connects the detector heads 24 with the electronics 25. The ring frame portion 20 has four pumps 27 attached thereto, each connected through a valve 29 and a spray nozzle 28 facing downward and each spray nozzle 28 being associated with one metal detector 22 detector coil 24. Each valve pump 27 is connected through the frame tubing to one metal detector housing 25 electronics and is actuated when metal is detected by the metal detector 22 to actuate the spray nozzle 28 to spray a fluid dye, or the like, directly onto the earth to mark where the detector coil 24 associated with the spray head detects metal. The valve pumps 27 can each be connected to a central reservoir 30 for delivering a colored dye or fluid thereto through a valve 29 to the nozzle 28 when actuated by the pump motor 27, which includes the pump for pumping the fluid to the spray nozzle 28.

In operation, the platform 13 moves forward riding on the motorized wheels 14 while the motorized shaft 15 is rotating to rotate the rotating frame 17 which rotates each of the four metal detectors 22 for the detector coils 24 to scan the earth 31. When a metal object, such as a coin 32, is sensed by the detector coil 24, the pump 27 is actuated to spray a colored fluid, or the like, onto the earth to mark the spot of the detected metal. The operator 11 operating the spot indicating metal detector system 10 from the remote control 12 can then locate the marked spots to search for the metal detected by the metal detector apparatus 10.

Figure 4:
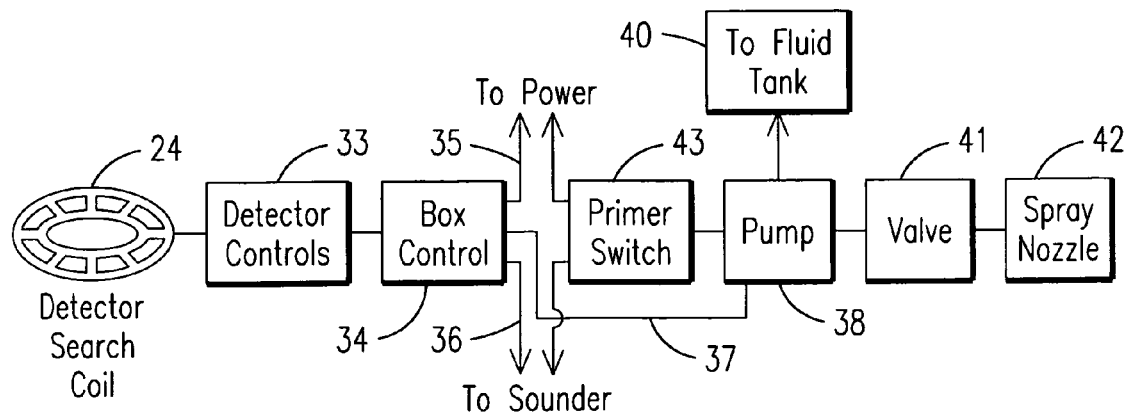
FIG. 4 is a block diagram of the electronic operation of the spray nozzles of the spot indicating metal detectors of FIGS. 1 through 3.

Turning to FIG. 4, a block diagram illustrates the operation of the spray nozzle in which a detector search coil 24 is connected to the metal detector controls 33 which has the box control 34 which is connected to a power source, such as a battery, through lines 35. An electronic pulse is provided to a sounder through the line 36 and also produces the signal through the line 37 to the pump 38 connected to a fluid tank 40 (30 in FIGS. 1-3). The pump actuates a valve 41 (29 in FIGS. 1-3) to dispense spray through the spray nozzle 42 (28 in FIGS. 1-3). The metal detector has a primary switch 43.

Figure 5:
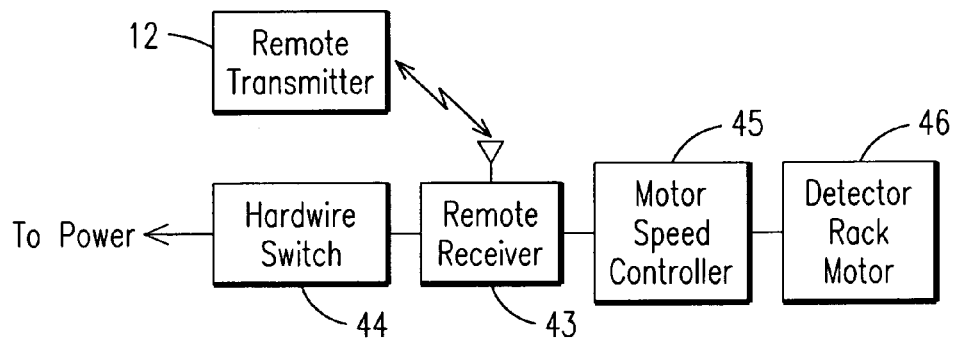
FIG. 5 is a block diagram of the remote controlled motorized platform of the metal detector of FIGS. 1 through 3.

In FIG. 5, the remote control 12 remotely communicates with a remote receiver 43 mounted on the platform 13 for controlling movement of the platform. The remote control has a hard wired switch 44 and can actuate the motor speed controller 45 and the detector rack motor 46.

Figure 6:
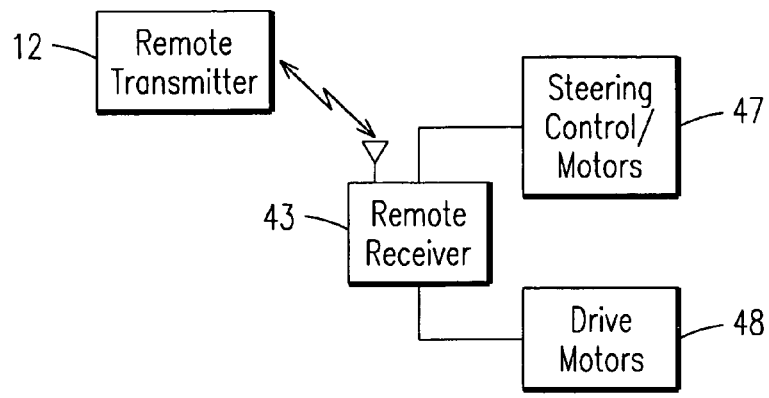
FIG. 6 is a block diagram of the remote control system of the remotely controlled platform.

In FIG. 6, the remote controller 12 can communicate or transmit to the remote receiver 43 to control the steering motor controls 47 in the drive motors 48.

It should be clear at this time that a spot indicating metal detector having a motorized platform in a rotating framework having a plurality of metal detectors thereon has been provided which can mark the spot where metal is detected. It should also be clear that variations, such as using aerosol spray cans for the pump/nozzle/reservoir or having one control head for a plurality of coils or having a hard wired controller or a riding platform, are within the spirit and scope of the invention. However, the present invention is not to be construed as limited to the forms shown which are to be considered illustrative rather than restrictive.

I claim:

1. A spot indicating metal detector apparatus comprising:
    a motorized platform;
    a motorized platform remote control for controlling the movement of the motorized platform remotely;
    a motorized shaft extending from said platform;
    a rotary frame attached to said motorized shaft for rotation therewith, said rotary frame having an upright frame portion and having a ring frame portion attached to said upright frame Portion by a plurality of angled frame members;
    a plurality of metal detectors fixedly mounted to said rotary frame ring frame portion for rotation therewith, each said metal detector having a detector coil mounted to said frame adjacent to the earth; and
    a plurality of spray heads, each said spray head being mounted to said ring frame portion adjacent one of said plurality of detector coils for rotation therewith for spraying a marker fluid therefrom onto the earth when actuated by one said metal detector detecting the presence of a metallic object;
    whereby a plurality of rotating metal detectors on a movable platform can identify the position of a detected metal object and mark the position with a spray a marker.

2. The spot indicating metal detector apparatus in accordance with claim 1 having four detector coils.

3. The spot indicating metal detector apparatus in accordance with claim 1 including a fluid reservoir attached to said frame for supplying fluid to each said spray head.

4. The spot indicating metal detector apparatus in accordance with claim 3 in which said fluid reservoir contains a liquid dye.

5. The spot indicating metal detector apparatus in accordance with claim 4 in which said motorized platform has a plurality of motorized wheels.

6. The spot indicating metal detector apparatus in accordance with claim 5 in which said motorized platform has four motorized wheels.

* * * * *